United States Patent [19]

Förderer et al.

[11] Patent Number: 5,699,865
[45] Date of Patent: Dec. 23, 1997

[54] ANTIVIBRATION DEVICE FOR MOUNTING BETWEEN A MOTOR UNIT AND A HANDLE UNIT

[75] Inventors: Karl Förderer, Schwaikheim; Klaus Höppner, Marbach; Gerd Fricke, Waiblingen, all of Germany

[73] Assignee: Andreas Stihl, Waiblingen, Germany

[21] Appl. No.: 693,634

[22] Filed: Aug. 9, 1996

[30] Foreign Application Priority Data

Aug. 21, 1995 [DE] Germany .................. 195 30 712.7

[51] Int. Cl.⁶ ........................ B25D 17/00; F16F 1/36
[52] U.S. Cl. ............... 173/162.2; 30/381; 30/383; 267/137; 267/153; 267/269
[58] Field of Search ................ 173/162.2, 162.1; 30/381, 382, 383, 384; 267/137, 153, 269, 292, 293, 294, 270

[56] References Cited

U.S. PATENT DOCUMENTS

| | | | |
|---|---|---|---|
| 3,845,557 | 11/1974 | Bailey | 173/162.2 |
| 3,911,580 | 10/1975 | Bailey | 30/381 |
| 3,972,119 | 8/1976 | Bailey | 30/381 |
| 4,138,812 | 2/1979 | Zimmerer et al. | 30/381 |
| 5,046,566 | 9/1991 | Dorner et al. | |
| 5,445,365 | 8/1995 | Forderer | 173/162.2 |
| 5,522,466 | 6/1996 | Harada et al. | 173/162.2 |

*Primary Examiner*—Scott A. Smith
*Attorney, Agent, or Firm*—Walter Ottesen

[57] ABSTRACT

The invention relates to an antivibration device between a motor unit 2 and a handle unit 9 of a portable handheld motor-driven chain saw 1. The antivibration device includes a sleeve-shaped elastic base body 6 having one of its ends 36 in a receptacle 20 of the motor unit 2 and the other end 46 in a receptacle 90 of the handle unit 9. The ends (36, 46) of the base body are fixed in the receptacles (20, 90) by axially engaging plugs (31, 41) in the end sections (30, 40). The guiding characteristics of the motor-driven chain saw are not affected by base bodies which become damaged or soft. This is so because at least one of the stops 31 has a coupling member 50 which bridges an axial spacing (z) between the plugs (31, 41) and projects into the other plug 41 and is latched so that it cannot be axially separated therefrom. A mechanical connection remains between the handle unit and the motor unit when the base body tears off.

20 Claims, 4 Drawing Sheets

ANTIVIBRATION DEVICE FOR MOUNTING BETWEEN A MOTOR UNIT AND A HANDLE UNIT

FIELD OF THE INVENTION

The invention relates to an antivibration device between a motor unit and a handle unit of a portable handheld work apparatus such as a motor-driven chain saw, cutoff machine or the like.

BACKGROUND OF THE INVENTION

An antivibration device is disclosed in U.S. Pat. No. 5,046,566 and is comprised essentially of a sleeve-shaped elastic base body having one end in a receptacle of the motor unit and the other end in a receptacle of the handle unit. The ends of the base body lie in the receptacles and are fixed by plugs engaging axially in the end sections. An attenuating section lies between the end sections and decouples the handle with respect to vibration from the motor unit. This simple configuration of an antivibration device is easy to assemble and provides excellent vibration attenuation with good guiding characteristics. However, deterioration of the material can lead to an antivibration device which becomes softer whereby the guidance and handling of the portable handheld work apparatus can under certain circumstances be affected. If a base body tears off, a reliable guidance of the work apparatus continues to be ensured because of the remaining base bodies. However, the guidance characteristics are deteriorated.

SUMMARY OF THE INVENTION

It is an object of the invention to provide an antivibration device wherein the guidance characteristics of the work apparatus are not significantly affected when the vibration-damping elastic base body becomes damaged or becomes softer.

The antivibration device of the invention is mounted between a motor unit and a handle unit of a portable handheld work apparatus such as a motor-driven chain saw, cutoff machine or the like. The antivibration device includes: a first receptacle formed in the handle unit; a second receptacle formed in the motor unit; a sleeve-shaped elastic base body having a first end portion mounted in the first receptacle and having a second end portion mounted in the second receptacle; a first plug axially seated and anchored in the first end section to fix the first end section in the first receptacle; a second plug axially seated and anchored in the second end section to fix the second end section in the second receptacle; the first and second plugs being spaced apart from each other an axial distance (z); the second plug including a coupling member bridging the axial distance (z) between the plugs; and, the coupling member including latching means for projecting into and engaging the first plug so as to cause the second plug to be axially inseparably connected to the first plug.

The two plugs, which hold the base body, are form-tightly coupled and axially inseparable. The coupling is effected by a coupling member which bridges the axial spacing between the plugs. With this coupling member, a coupling of the motor unit and handle unit to each other is provided in addition to the connection via the base body. If in an extreme case, the elastic base body tears off, then the connection between the motor unit and the handle unit remains via the coupling member at the location of the anti-vibration device. Accordingly, a significant reduction of the guiding performance of the work apparatus does not occur notwithstanding a tear-off of the base body.

The coupling member has a lock element to provide a simple interlocked axially inseparable connection between the plugs. The lock element is assigned a lock opening in the opposite-lying plug. The coupling element preferably lies with play in the lock opening so that no mechanical connection between the plugs is provided when the base body is operationally sound. Otherwise, the mechanical connection could cause a transfer of vibration. Preferably, the lock element is configured so as to be wider than the coupling member.

The coupling member is advantageously configured as a single piece with the plug carrying the same. The material of the plug and of the coupling member is preferably plastic. A tough-elastic plastic is especially suitable for this use because this material also exhibits vibration-attenuating characteristics. At least a partial decoupling of the motor unit to the handle unit is ensured even when a mechanical connection via the coupling member is provided between the plugs and therefore between the motor unit on the one hand and the handle unit on the other hand. Here, it is advantageous that the plugs are fixed exclusively via the elastic base body in the receptacle of the motor unit and the receptacle of the handle unit, respectively, that is, the plugs are held in the respective receptacles so as to attenuate vibration.

The length of the slot of the lock opening preferably corresponds to the inner diameter of the lock plug in order to obtain a reliable interlock. The closure head is configured so as to be correspondingly large.

A further advantage of the configuration of the invention is that the antivibration element can be assembled from one end of the base body. In this way, one receptacle can be a blind bore which essentially has a depth which must correspond to the axial length of the plug and to the end section of the base body to be accommodated in the receptacle. The plug is mounted in the blind bore and the end section is then seated in the receptacle. From the other end face of the base body, the plug is then pulled through the lock opening into the base body. The end section of the base body seated in the receptacle is then completely assembled via the plug which was axially pulled in.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
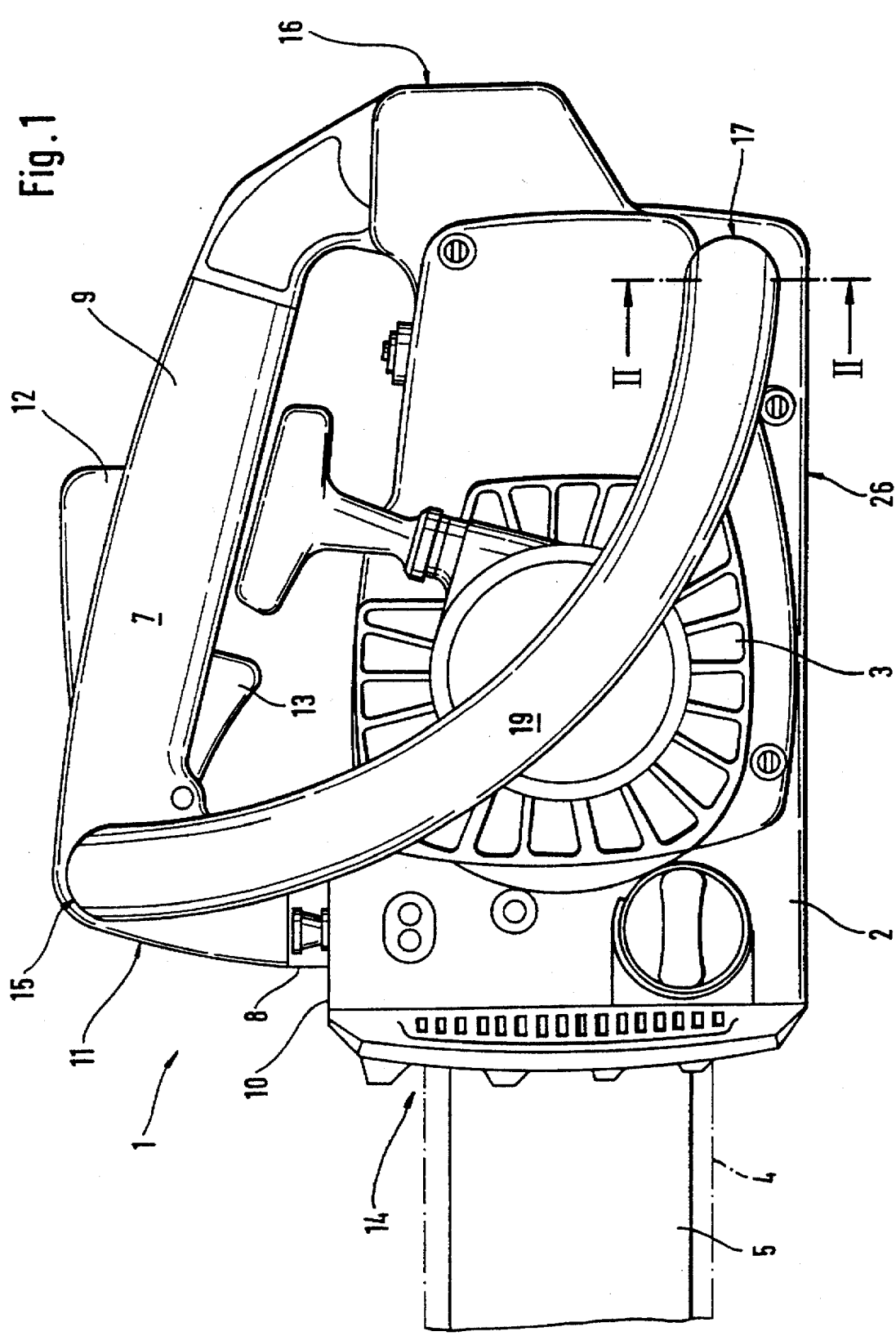
FIG. 1 is a side elevation view of a motor-driven chain saw which includes a motor unit and a handle unit connected thereto via antivibration devices.

FIG. 1 shows a portable handheld work apparatus 1 in the form of a motor-driven chain saw which includes a motor unit 2 and a handle unit 9. A drive motor 3 is mounted in the housing of the motor unit 2 and, in the embodiment, is in the form of a manual-start internal combustion engine. The drive motor 3 drives a saw chain 4 mounted for movement around a guide bar 5. The guide bar 5 extends in the longitudinal direction of the motor-driven chain saw forward of the forward end 14 thereof.

The handle unit 9 comprises an upper handle 7 positioned in the longitudinal direction of the work apparatus. The handle 7 is attached with its forward end 11 to the upper side 10 of the motor unit 2 with a vibration-attenuating device 8. The rearward end of the upper handle 7 is connected via a vibration-attenuating device to the rearward end section 16 of the motor unit 2. In the upper handle 7, a throttle lever 13 is mounted on the inner side facing toward the upper side 10 of the motor unit 2. A throttle lever latch 12 is provided in the region of the upper side of the handle 7.

The portable handheld work apparatus further includes a side bail handle 19 which extends at a lateral spacing with respect to the motor unit 2. The upper end 15 of the bail handle 19 is fixedly connected to the handle 7 at the region of the forward end of the upper handle. The lower end 17 of the bail handle 19 is fixedly connected to the rearward end section 16 in the region of the lower side 26 of the motor unit 2. The connection between the handle unit 9 and the lower end 17 of the lateral bail handle 19 is provided via an antivibration device 18 as shown in the section view of FIG. 2.

Figure 2:
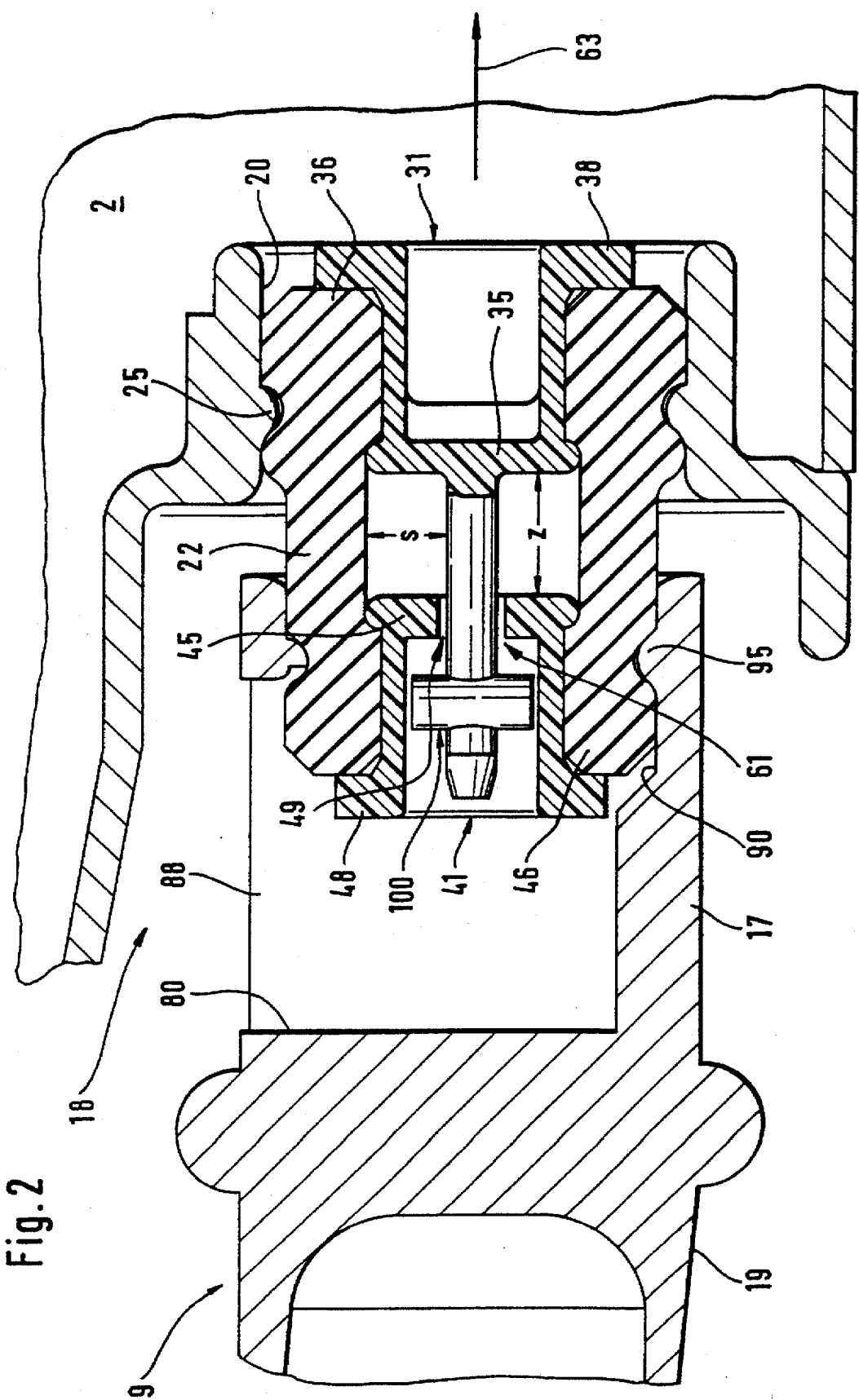
FIG. 2 is a section view taken along line II—II of FIG. 1 and shows the elastic sleeve-shaped base body of the antivibration device.
Figure 3:
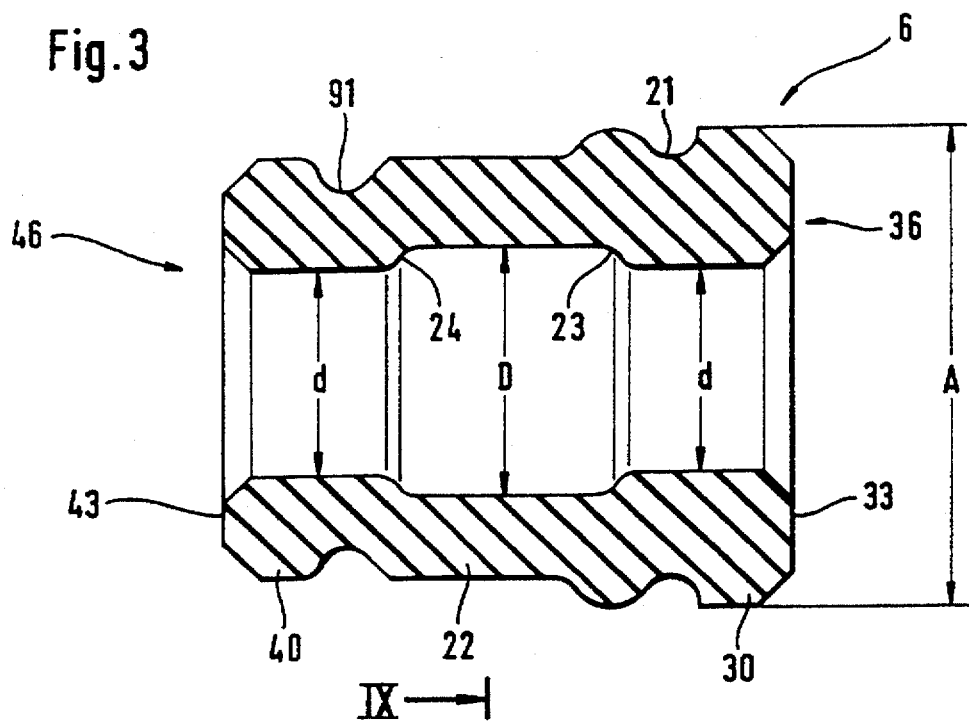
FIG. 3 is a section view taken through the base body of the antivibration device of FIG. 2.

The antivibration device 18 comprises essentially a preferably sleeve-shaped elastic base body 6 which defines the attenuating element of the antivibration device. The base body 6 is shown enlarged in FIG. 3 and comprises end sections (30, 40) which are connected to each other by an attenuating section 22. The attenuating or damping section 22 has an inner diameter D which is slightly greater than the inner diameter (d) of the end sections (30, 40). In this way, a peripherally extending backcut (23, 24) is provided at the transition from each end section (30, 40) to the damping section 22. The backcuts (23, 24) ensure that the plugs (31, 41) shown in FIG. 2 are held so as to be fixed axially. The plugs (31, 41) are to be seated in the end sections (30, 40), respectively.

In the outer periphery of the base body 6, a peripherally extending groove 21 is provided between the end face 33 and the backcut 23 and a groove 91 is formed in the region between the end face 43 and the backcut 24. The groove 21 functions to hold the base body 6 in the receptacle 20 of the motor unit 2 in a form-tight manner and the groove 91 functions to hold the base body 6 in the receptacle 90 of the handle unit 9.

As shown in FIG. 2, the end 36 is larger in the outer diameter A and is axially seated in the receptacle 20 of the motor unit 2 (FIG. 2). An inner bead-shaped holding rib 25 of the receptacle preferably extends peripherally and engages in the receiving groove 21 of the base body 6 whereby the base body is axially held in the receptacle 20 in a form-tight manner.

In the same way, the other end 46 of the base body 6 is seated in a receptacle 90 of the handle unit 9 or, more specifically, in the receptacle 90 of the end 17 of the lateral bail handle 19. Also in this receptacle 90, an inner bead-shaped holding rib 95 is provided which extends preferably peripherally and engages in the receptacle groove 91 in the base body 6 and axially holds the base body in the receptacle 90 in a form-tight manner.

The ends (36, 46) must be secured because the base body 6 is made of a vibration-attenuating elastic material and the ends (36, 46) engage in respective ones of the receptacles (20, 90). Plugs (31, 41) are seated axially in respective ones of the end sections (30, 40).

Figure 8:
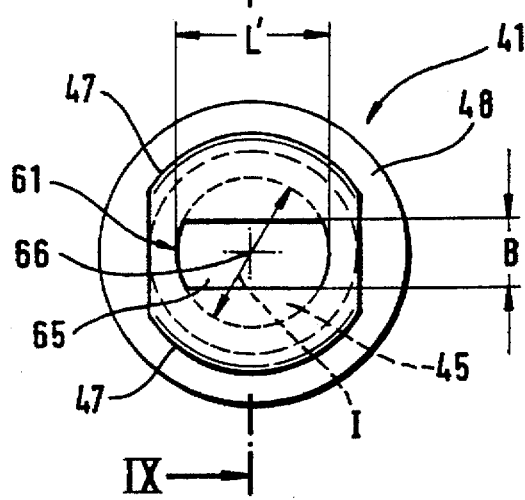
FIG. 8 is an end view of another plug of the antivibration device.
Figure 9:
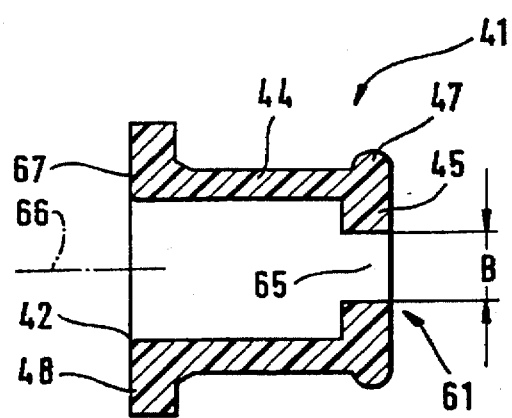
FIG. 9 is a section view through the plug of FIG. 8 taken along line IX—IX thereof.
Figure 4:
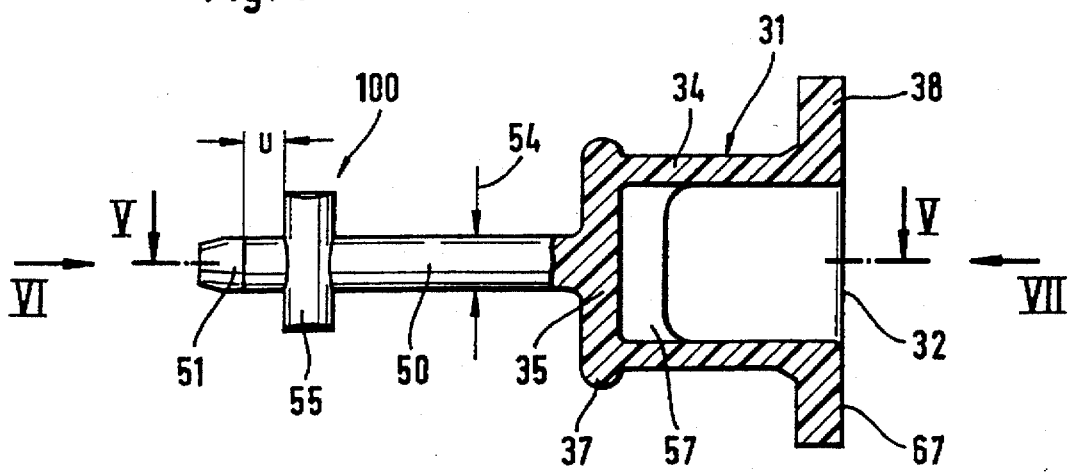
FIG. 4 is a side elevation view, partially in section, of a plug having a coupling member formed thereon as one integral piece therewith.

In the embodiment shown, each plug (31, 41) is configured so as to have a pot-like shape. The base (35, 45) of each plug (31, 41) in the base body 6 lies approximately at the elevation of the backcuts (23, 24). Each plug (31, 41) has an outer holding bead (37, 47) at the elevation of the base (35, 45) as shown in FIGS. 4 and 9. The holding beads (37, 47) engage behind corresponding ones of the backcuts (23, 24) as shown in FIG. 2. Each pot-shaped plug (31, 41) has an outer ring flange (38, 48) formed thereon at the opening edge (32, 42). The ring flange (38, 48) has a circular shape for the plugs of FIGS. 8 and 9 and at least one flattened portion 39 for the plug 41 of FIGS. 4 to 7. The plug preferably has two diametrically opposite-lying flats 39. The outer annular flange of both plugs (31, 41) can be configured so as to have a circular shape or be configured to have flats.

Each plug is so seated in the base body 6 that the end face 33 or 43 of the base body 6 is in contact engagement with the ring flange 38 or 48. In this position, the holding bead (37, 47) of the respective plug (31, 41) engages the backcuts (23, 24), respectively, essentially without play. The outer diameter of the main body (34, 44) of the plug (31, 41) is then so dimensioned that, preferably, a slight pressing of the particular end section (30, 40) occurs whereby a hardening of the end section is provided. The end sections are then reliably held in their receptacles (20, 90) also against significant pull forces which occur. The attenuating section 22 bridges the distance between the motor unit 2 and the handle unit 9 and effects a decoupling of the handle unit 9 from the motor unit 2 with respect to vibrations so that the vibrations emanating from the drive motor are substantially held away from the handle unit 9.

According to the invention, at least one of the plugs includes a coupling member 50 (in the embodiment, plug 31) which bridges the axial spacing (z) between the end faces of the plugs 31 and 41 which face toward each other. The coupling member 50 projects into the other plug 41 and is latched thereto so that it cannot axially separate therefrom.

Figure 6:
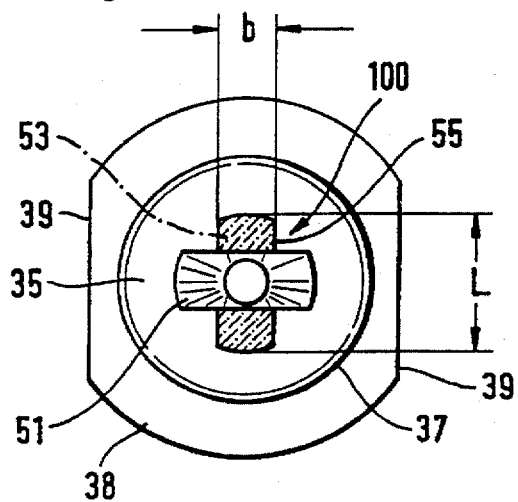
FIG. 6 is an end view of the plug as seen in the direction of arrow VI in FIG. 4.

In the embodiment shown, the coupling member 50 includes a lock element 100 to which a lock opening 61 is assigned in the plug 41 facing toward the coupling member. As shown in FIGS. 4 and 6, the lock element 100 is configured as a transverse pin 55 lying approximately at right angles to the coupling member 50. The transverse pin 55 coacts with a lock opening 61 formed as a slot 65 in the opposite-lying plug 41. The coupling member 50 is provided with a head 51 at the forward end thereof. The head 50 is configured as a strut extending transverse to the coupling member 50 and extends orthogonally to the lock element 100 as shown in FIG. 6. The head 51 can be configured as a truncated cone whereby a simple insertion into the lock opening 61 is ensured. The lock opening 61 is especially configured as a slot 65 in the base 45 of the opposite-lying plug 41.

As shown in FIG. 6, the transverse pin 55 of lock element 100 has a maximum length L and a maximum width (b). The head 51 lies at a spacing (u) to the transverse pin 55. As shown in FIG. 8, the slot 65 in the base 45 of the plug 41 has a length L' which is slightly greater than the length of the head 51. Correspondingly, the width B of the slot 65 is slightly greater than the width (b) of the transverse pin 55 of lock element 100.

When the lock element 100 is aligned to the slot 65, then it can be axially inserted into the plug 41. The coupling member 50 is preferably configured as a rod and advantageously lies with play 49 in the lock opening 61 as shown in FIG. 2. For this purpose, it is advantageous that the lock element 100 is wider than the coupling member 50; that is, the diameter 54 of the coupling member 50 is less than the width (b) of the transverse pin 55 of lock element 100. The coupling member 50 is preferably cylindrical and has a rod-like shape.

Figure 5:
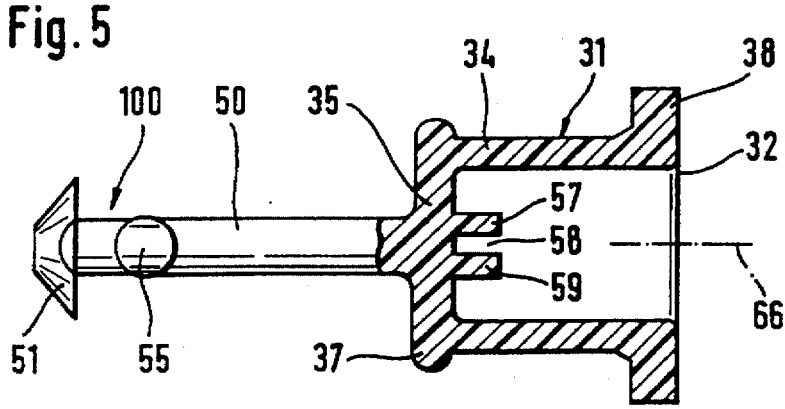
FIG. 5 is a view, partially in section, of the plug of FIG. 4 taken along line V—V thereof.
Figure 7:
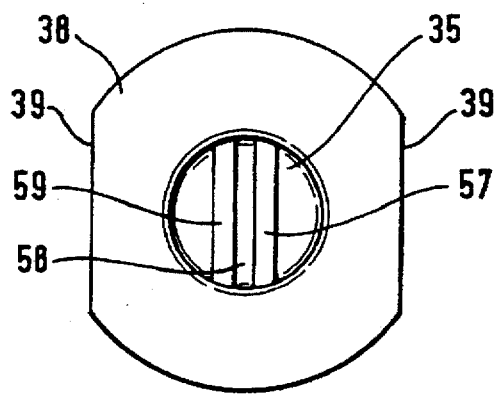
FIG. 7 is a rear view of the plug viewed in the direction of arrow VII in FIG. 4.

The plugs (31, 41) are rotated relative to each other after the lock element 100 enters axially through the lock opening 61 in the opposite-lying plug 41. To execute the rotational movement, preferably a slot 58 for a screw driver is formed on the base 45 within the interior space of the plug 31. The slot is preferably delimited by two ribs (57, 59) which are connected to base 45 and the interior periphery of the main body 44 as shown in FIGS. 4, 5 and 7.

By rotating the plug 31, the head 51 is first rotated relative to the plug 41 or its lock opening 61 and is introduced into this lock opening. Then, by rotating the plug by 90°, the coupling member is brought into a position coinciding with the slot opening 61 and is moved through this opening with an axial displacement. By again rotating by 90°, the lock element 100 is latched relative to the lock opening 61 so that it cannot axially separate therefrom.

With a break of the base body 6, an axially inseparable connection between the motor unit 2 and the handle unit 9 is maintained because the lock element 100 cannot exit from the lock opening 61 of the plug 41. The plugs 31 and 41 are essentially held by a friction lock so that they cannot rotate. For this reason, the axial inseparable latching is reliably ensured when there is a tearoff of the base body 6. The protection against rotation can be increased by a slightly elliptical configuration of the main bodies (34, 44) of the respective plugs (31, 41).

The lock element 100 lies with slight play in the interior of the plug 41. The narrow ends of the lock element 100 are preferably circularly rounded as shown in FIG. 6 so that the necessary relative rotational movement to the bayonet-like latch is not hindered. The circular-shaped rounded narrow ends also afford the advantage that the maximum length L of the transverse pin 55 can be selected to be very large so that the overlap (hatched area 53) indicated in FIG. 6 is maximized in the latched condition. The maximum length L' of the slot 65 can then correspond to the inner diameter I of the lock plug 41.

The plugs (31, 41) are preferably made of plastic and especially of a tough elastic plastic. The coupling member 50 is advantageously configured with the plug 41 supporting the latter. The rod-shaped coupling member 50 lies coaxial to the longitudinal axis 66 of the plug 41. In the assembled condition, the rod-shaped coupling member 50 lies with radial play (s) coaxially in the base body 6 and in the opposite-lying plug 41.

As shown in FIG. 2, the coupling member 50 advantageously extends through the slot 65 of the lock opening 61 as well as essentially the entire axial length of the lock plug 41 in such a manner that the head 51 lies approximately at the elevation of the end face 67 of the lock plug 41. Preferably, the head 51 projects out of the plug 41. The lengths are so matched that the head 51 is axially inseparably latched in the lock opening 61 before the plug 31 is axially pressed with the coupling rod 50 into the base body 6. This affords the advantage that the antivibration device 18 can be preassembled on the handle unit. For this purpose, a blind bore 80 is introduced into the end face of the end 17 of the bail handle 19. This blind bore 80 lies axially behind the receptacle 90 for the end 46 of the base body 6. The blind bore 80 extends into the receptacle 90.

Now, the lock plug 41 is first seated with the annular flange 48 axially in the blind bore. Thereafter, the end 46 of the elastic base body 6 is pushed axially into the receptacle 90 until the holding rib 95 snaps into the receptacle slot 91. Now, a tool with a locking head is axially inserted through the lock opening 61 of the lock plug 41 lying in the blind bore 80 and is rotated by 90° so that the lock plug 41 is now axially connected form-tight with the tool. The lock plug 41 is pulled by means of the tool axially out of the blind bore 80 in the direction of arrow 63 and into the receptacle 90 until the annular flange 48 is in contact engagement with the end face 43 of the base body 6 and the holding bead 47 engages behind the backcut 24 in the elastic base body 6. The tool is then again rotated by 90° and the tool head is moved out of the lock opening 61. The end 46 of the base body 6 of the antivibration device 18 is mounted on the side bail handle 19 of the handle unit 9.

The plug 31 can be preassembled with the rod-shaped coupling member 50 which is coaxially connected to the base 35 of the plug 31. This is achieved in that the head 51 is inserted through the lock opening 61 of the assembled lock plug 41 and is latched axially form-tight to the lock plug 41 by rotation. In this preassembled condition, the plug 31 and the end 36 of the base body of the antivibration device 18 can be inserted into the receptacle 20 of the motor unit 2 in the direction of arrow 63. As soon as the inner holding rib 25 of the receptacle 20 snaps into the peripheral slot 21 of the end section 30 of the base body 6, the plug is pushed axially into the end section 30 in a direction opposite to arrow 63 and, with an appropriate rotation, the lock element 100 is introduced through the lock opening 61. The base body 6 is then also inseparably fixed to the motor unit 2 by a further rotation of the plug 31.

If the axial length of the rod-shaped coupling member 50 is configured so as to be longer than the base body 6, then the lock plug 31 with the coupling member 50 formed as one piece therewith can be used as a tool for pulling the lock plug 41 into the end section 40 of the base body 6.

By configuring the lock plug with a lock opening, it is possible to assemble the antivibration device from one side of the base body 6. In this way, the antivibration device is mounted on the bail handle directly at the end face. This makes possible a direct assembly in a blind bore of the end of the bail handle.

The head 51 is preferably configured as a truncated cone and the cone angle extends in the direction of the longitudinal dimension of the head 51.

The assembly of the antivibration device 18 can, however, be performed in a significantly simpler manner and without any work tool in that the base body 6 is first pushed into the receptacle 20 until the inner holding rib 25 engages in the peripheral slot 21 of the end section 30 of the base body 6. Thereafter, the plug 31 is inserted and is pushed so far opposite to the direction of arrow 63 until the holding bead 37 engages the backcut 23. The annular flange 38 then lies on the end face 33 of the base body 6.

The handle unit 9 is then inserted on the end section 90 of the base body 6 in that this end section is introduced into the blind bore 80. The base body 6 is then inserted so far until the holding rib 95 engages into the receptacle slot 91. Thereafter, the insertion of the lock plug 41 in the blind bore 80 takes place and is done via an assembly window 88 in the wall of the lower end 17 of the handle unit 9. The assembly window 88 is provided for this purpose. The base 45 of the lock plug 41 is first pushed over the head 51 and then over the lock member by an appropriate rotation and axial displacement in the direction of arrow 63. In the end position of the plug 41, the holding bead 47 engages behind the backcut 24 and the rotational angle of the two plugs 31 and 41 is such that the longitudinal directions of the lock opening 61 and transverse pin 55 of lock element 100 are at an angle of 90° to each other.

It is understood that the foregoing description is that of the preferred embodiments of the invention and that various changes and modifications may be made thereto without departing from the spirit and scope of the invention as defined in the appended claims.

What is claimed is:

1. An antivibration device between a motor unit and a handle unit of a portable handheld work apparatus such as a motor-driven chain saw, cutoff machine or the like, the antivibration device comprising:

a first receptacle formed in said handle unit;

a second receptacle formed in said motor unit;

a sleeve-shaped elastic base body having a first end portion mounted in said first receptacle and having a second end portion mounted in said second receptacle;

a first plug axially seated and anchored in said first end section to fix said first end section in said first receptacle;

a second plug axially seated and anchored in said second end section to fix said second end section in said second receptacle;

said first and second plugs being spaced apart from each other an axial distance (z);

said second plug including a coupling member bridging said axial distance (z) between said plugs; and, said coupling member including latching means for projecting into and engaging said first plug so as to cause said second plug to be axially inseparably connected to said first plug.

2. The antivibration device of claim 1, said coupling member including a lock element formed thereon; and, said first plug having a lock opening formed therein for receiving said lock element.

3. The antivibration device of claim 2, said lock element lying in said lock opening with play.

4. The antivibration device of claim 2, said coupling member defining a longitudinal axis; said lock element being a transverse pin approximately perpendicular to said longitudinal axis; and, said lock opening being a slot corresponding to said transverse pin.

5. The antivibration device of claim 4, said coupling member including an elongated element defining said longitudinal axis; and, said transverse pin being wider than said elongated element.

6. The antivibration device of claim 5, said elongated element having a head formed on the end thereof for passing into said lock opening; and, said head having a shape corresponding to a truncated cone.

7. The antivibration device of claim 6, said head being elongated and extending transversely to said longitudinal axis; and, said elongated head being aligned orthogonally to said transverse pin.

8. The antivibration device of claim 7, said first plug having a base wall and said slot being formed in said base wall.

9. The antivibration device of claim 8, said elongated element being a rod and extending across said axial distance; and, said rod being coaxial with said base body and spaced at a distance (s) therefrom.

10. The antivibration device of claim 9, said coupling member being formed as one piece with said second plug.

11. The antivibration device of claim 10, said coupling member being made of a tough elastic plastic.

12. The antivibration device of claim 11, said first plug having an end face lying opposite said base wall and said coupling member extending axially through said first plug so as to cause said head to be approximately at the elevation of said end face.

13. The antivibration device of claim 12, said second plug also having a base wall and said first and second plugs having a pot-shaped configuration and being seated in said base body so that said base walls thereof lie within said base body.

14. The antivibration device of claim 13, each of said plugs having an external holding bead formed thereon.

15. The antivibration device of claim 14, each of said pot-shaped plugs having an end face at the axial end thereof facing away from the base wall thereof; and, each of said pot-shaped plugs having an external annular flange formed at said end face thereof.

16. The antivibration device of claim 15, said external annular flange having at least one flat formed thereon.

17. The antivibration device of claim 16, each of said plugs being held in said base body so as to be secure against rotation with respect to the latter.

18. The antivibration device of claim 17, said base wall of said second plug having an interior side; and, said second plug having a work tool receptacle formed on said interior side thereof.

19. The antivibration device of claim 18, said work tool receptacle being defined by two ribs formed on said interior side of said base wall of said second plug; and, said two ribs being mutually adjacent to define a slot for receiving the work tool therein.

20. The antivibration device of claim 13, said first plug having an inner diameter (I); and, said slot having a length (L') corresponding to said inner diameter (I).

* * * * *